United States Patent [19]

Steidl

[11] 3,855,420

[45] Dec. 17, 1974

[54] SUPERVISORY CIRCUIT

[75] Inventor: Robert Elling Steidl, Columbus, Ohio

[73] Assignee: Bell Telephone Laboratories Incorporated, Murray Hill, N.J.

[22] Filed: Mar. 26, 1973

[21] Appl. No.: 344,995

[52] U.S. Cl. .......................... 179/17 A, 179/18 FH

[51] Int. Cl. .......................................... H04q 3/18

[58] Field of Search .......... 179/17 A, 18 FG, 18 FF, 179/84 A, 7 MM, 18 FH, 8.5, 18 FA, 18 F

[56] References Cited

UNITED STATES PATENTS

| | | | |
|---|---|---|---|
| 2,892,036 | 6/1959 | Harris | 179/17 A |
| 3,321,583 | 5/1967 | Maul | 179/18 |

OTHER PUBLICATIONS

Glossary of Communications by Emerson C. Smith, published by Telephony Publishing Co. p. 53.

*Primary Examiner*—Kathleen H. Claffy
*Assistant Examiner*—C. T. Bartz
*Attorney, Agent, or Firm*—D. E. Nester

[57] ABSTRACT

A supervisory circuit in a telephone switching system includes two current sensing transistors, each adapted to detect current flow in alternate directions through a subscriber's loop serving one or more stations. The conductive or nonconductive state of the transistors in combination sequentially defines supervisory states which represent on- and off-hook indications, dialed digits, as well as party identification. The party identification is utilized to ascertain which of the plural stations served by a party line is presently instituting a call.

10 Claims, 2 Drawing Figures

SUPERVISORY CIRCUIT

FIELD OF THE INVENTION

This invention relates to communication switching systems, and, more particularly, to telephone switching systems including circuitry for gathering automatic message accounting or charging information.

BACKGROUND OF THE INVENTION AND PRIOR ART

The implementation of direct distance dialing in the telephone system necessitated that subscriber billing information be automatically and accurately compiled to record, for each long distance call, the calling telephone number, the called telephone number, the time the connection was established, and the time the connection was broken down. In step-by-step switching systems, the compilation of this billing information is made more difficult since the circuit elements that detect statuses necessary to gather this information are numerous and decentralized. In a step-by-step switching system, and subscriber's mechanical pulsing dial directly controls the switching stages. Unlike many other switching systems, the step-by-step system does not have a marker or common control to collate information from various circuit elements into a single entry specifying the requisite billing information.

Many step-by-step switching systems service rural areas with insufficient telephone usage to have made it economically feasible in the past to install automatic message accounting (AMA) apparatus at each rural office. One prior art arrangement overcame this problem by adapting a single intertoll office to gather AMA data concerning calls instituted at a plurality of local step-by-step offices. This centralized facility was operative but suffered from the disadvantage that billing information could be gathered only for interoffice calls and not intraoffice calls.

Today telephone subscribers are afforded the opportunity of having many service features in addition to normal telephone service. These subscribers want comprehensive billing information so that they may substantiate their monthly charges as well as monitor the specific usage of their telephone systems. This requirement and the many available customer billing options necessitate that in certain instances AMA information be compiled for local intraoffice calls as well as long distance interoffice calls.

It is an object of this invention efficiently and economically to gather AMA information in step-by-step switching offices for both intraoffice and interoffice calls.

It is a further object of this invention to gather this information without interfering with the normal operation of the step-by-step switching system.

SUMMARY OF THE INVENTION

In accordance with this one illustrative embodiment of my invention, a supervisory circuit adapted to gather AMA information is inserted between a line finder and a first selector in a step-by-step switching office. This supervisory circuit includes two current sensing transistors each adapted to detect current flow in alternate directions through a subscriber's loop connected to the transistors via the line finder. As a call progresses, the conductive or nonconductive states of these transistors, in combination, sequentially define many of the statuses needed to compile AMA data. These include the on- and off-hook state of both the calling and called stations, dialed digits, call disconnect and party identification information. The party identification information indicates whether a so-called tip-party station or ring-party station is presently instituting a call over a party line.

A peripheral scanner periodically determines the conductive or nonconductive state of the transistors by strobing scan gates in the supervisory circuit. Each scan gate is responsive to the state of an associated transistor. The states of the transistors are conveyed by the peripheral scanner to a data processor which derives AMA information based upon these states and subsequently stores the derived information on a disc file.

GENERAL DESCRIPTION

Figure 1:
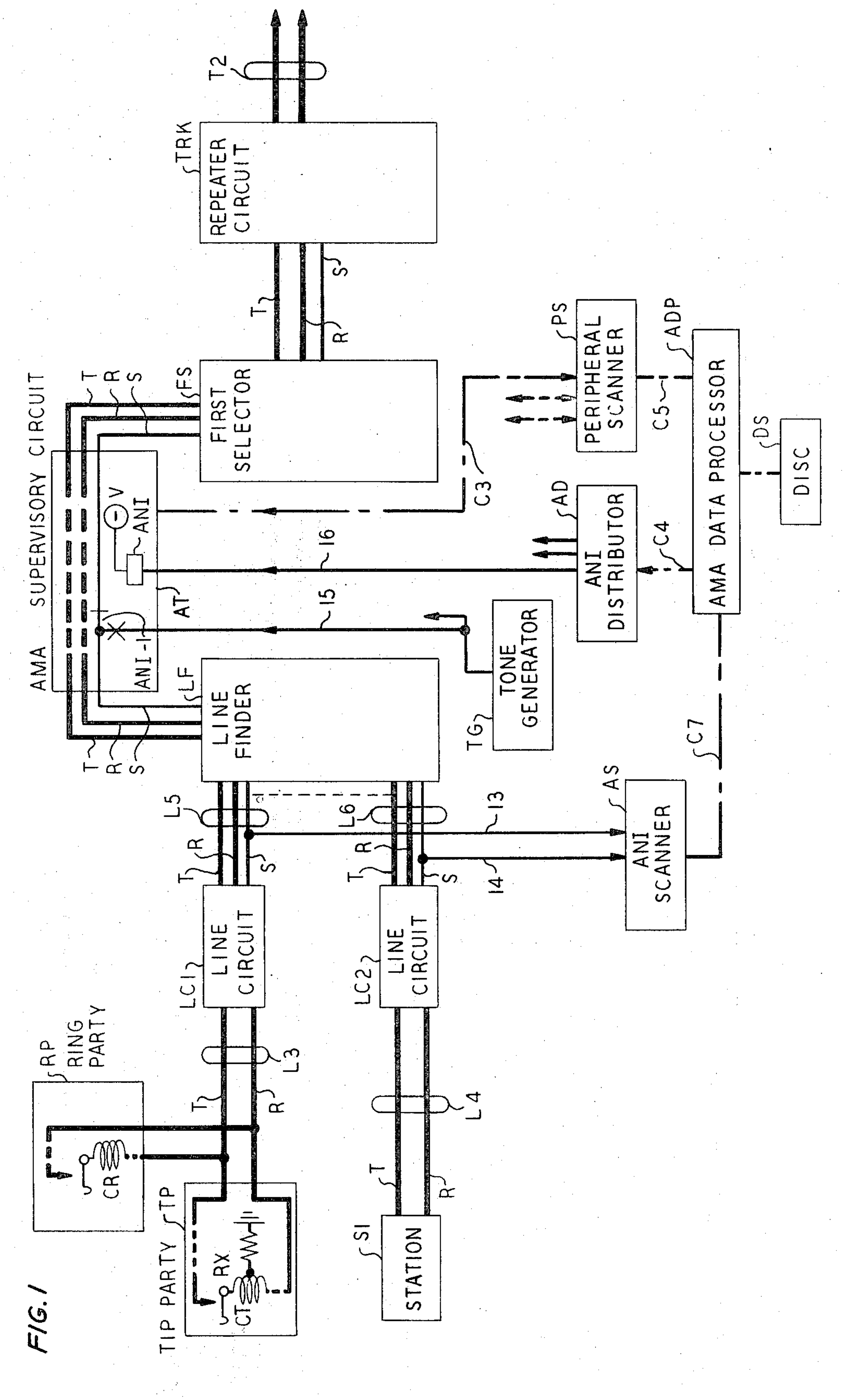
FIG. 1 is a block diagram of a step-by-step switching system and associated apparatus for gathering AMA data configured in accordance with one illustrative embodiment of my invention.

FIG. 1 is a block diagram depicting a step-by-step switching system in which AMA information is beneficially gathered in accordance with the principles of my invention. As hereinafter described more fully, AMA supervisory circuit AT detects the bidirectional flow of current through a subscriber's loop L3 or L4; and AMA data processor ADP utilizes this information to compile AMA information concerning a call instituted over the loop.

In an effort to simplify the description as much as possible consistent with the full disclosure of my invention, only three telephone stations S1, TP and RP have been illustrated. Moreover, only a single line finder, first selector, and repeater circuit are shown. However, in an actual step-by-step office, a plurality of such circuits would be utilized to service a plurality of telephone stations. For example, in a typical 1,000 line step-by-step office at least five line finder groups are provided with each group including as many as 20 line finders. It is contemplated that a supervisory circuit will be provided between each line finder and first selector in an actual embodiment.

The operation of the depicted step-by-step switching office is described only to the extent that a full understanding of my invention can be realized. For a more comprehensive understanding of a step-by-step switching system, reference can be made to chapter III of K. B. Miller's book entitled *Telephone Theory and Practice*, published in 1933 by the McGraw-Hill Book Company, Inc.

Communication service is provided to telephone station S1 over subscriber's loop L4, and is provided over subscriber's loop L3 to tip-party station TP and ring-party station RP. Subscriber's loop L3 is a so-called party line which services more than one subscriber's station.

As is well known in the telephone art, to differentiate between a tip and a ring station the coil of the tip station is grounded to provide a d.c. ground whereas the coil of the ring station is left ungrounded. By applying a d.c. potential to a subscriber's loop and by detecting the presence or absence of current flow through the loop, a party identification test can be performed to determine whether a tip party or a ring party is instituting a call. In the disclosed embodiment of my invention, coil CT of tip party station TP is grounded via resistor RX of approximately 1,100 ohms, whereas coil CR of ring party station RP is not grounded. As hereinafter described, when a potential is applied to loop L3 by means within supervisory circuit AT, current flows through the loop if, and only if, tip-party station TP is instituting the call.

Line circuits LC1 and LC2 are conventional step-by-step line circuits and may beneficially be of the type shown in FIG. 59 on page 103 of the above-mentioned Miller book. The primary function of a line circuit is to indicate to line finder LF that its associated subscriber's loop has been closed, i.e., an associated station has gone off-hook. When a subscriber lifts his telephone off the switch hook, a line relay in the associated line circuit operates and marks the sleeve lead in the line circuit by applying a battery potential thereto.

Line finder LF is adapted to find a calling subscriber's line from a comparatively large group of lines by hunting until it finds the sleeve terminal marked with battery. Upon finding the calling line, line finder LF extends the tip, ring, and sleeve leads associated with the line to first selector FS. Line finder LF is uniquely and permanently associated with first selector FS. The operation and composite elements of one illustrative line finder is described in Miller's book in regard to FIG. 59 on page 103.

First selector FS comprises a step-by-step switch responsive to the first set of dial pulses (i.e., call signals specifying a first digit) dialed by the subscriber. Selector FS steps up a number of places equal to the number of pulses and thereby further connects the tip, ring, and sleeve leads associated with the calling line to either a second selector for intraoffice calls or a repeater circuit for interoffice calls dependent upon the number of received dial pulses. A suitable first selector is illustrated on page 69 of the book by Miller.

Repeater circuit TRK is connected via communication path T2 to an incoming selector (not shown) at a remote office. Circuit TRK repeats further dialed digits, conveys them to this remote office, and releases the connection when the stations go on-hook. A suitable repeater circuit is illustrated and described in regard to FIG. 54 on page 87 of Miller's book.

AMA data processor ADP advantageously comprises a minicomputer including a memory and a processing unit for performing logical and arithmetic operations on data in accordance with stored program instructions. In this illustrative embodiment of my invention, processor ADP is programmed to fulfill a billing compilation process as is hereinafter described. Disc DS is a commercial disc file comprising one or more discs for storing data and program instructions at discrete addressable locations. Processor ADP also includes an interface unit for selectively retrieving information from or storing information on disc DS.

Peripheral scanner PS serves as processor ADP's source of information concerning the conductive states of the current sensing transistors (TT and RT in FIG. 2) in each of the supervisory circuits AT. Scanner PS comprises a sequencer for generating HIGH strobe pulses and for sequentially applying these pulses to output leads each unique to a supervisory circuit AT. These pulses, as hereinafter explained, strobe scan gates in each of the supervisory circuits. The HIGH or LOW output signals from these scan gates which specify the conductive states of the associated transistors are conveyed through scanner PS to processor ADP over leads in cable C5 unique to the scan gates. Scanner PS also comprises an actuatable switch for temporarily stopping the sequencer. After the sequencer has been stopped, processor ADP, as hereinafter, described, sets the sequencer to a specific output lead so that the scan gates in a specified supervisory circuit AT can be interrogated out of the normal sequence. This is accomplished to perform a party identification test.

Specifically with reference to FIG. 2, scanner PS, as later described more fully, periodically applies a HIGH strobe pulse to lead S1 of cable C3 to interrogate scan gates G1 and G2 in supervisory circuit AT. The HIGH or LOW output signals from these gates which specify the conductive states of transistors TT and RT are conveyed over leads L1 and L2 of cable C3 through scanner PS and to processor ADP over similar leads of cable C5.

ANI distributor AD shown in FIG. 1 comprises a decoder responsive to supervisory circuit identity information from processor ADP for selectively applying ground to the one output lead uniquely associated with the identified circuit. Specifically, when processor ADP conveys information identifying circuit AT, ANI distributor AD decodes this information and in response thereto applies ground only to lead 16. This actuates relay ANI in supervisory circuit AT. Relay contacts ANI–1 connect tone generator TG to the sleeve lead in circuit AT. A tone applied over lead 15 from generator TG traverses the sleeve lead through line finder LF and is conveyed over the connected sleeve lead of a line circuit. This tone is further conveyed to ANI scanner AS over either lead 13 or 14. Scanner AS comprises a scanner for sequentially examining leads 13 and 14 (and other leads connected to the sleeve leads of line circuits which are not shown) and for stopping the scanning when a tone is detected, thereby identifying the line circuit associated with the calling station. This line circuit identity derived by scanner AS is conveyed to processor ADP and, as hereinafter described, is utilized in the generation of the line equipment number of the calling station.

DETAILED DESCRIPTION

Figure 2:
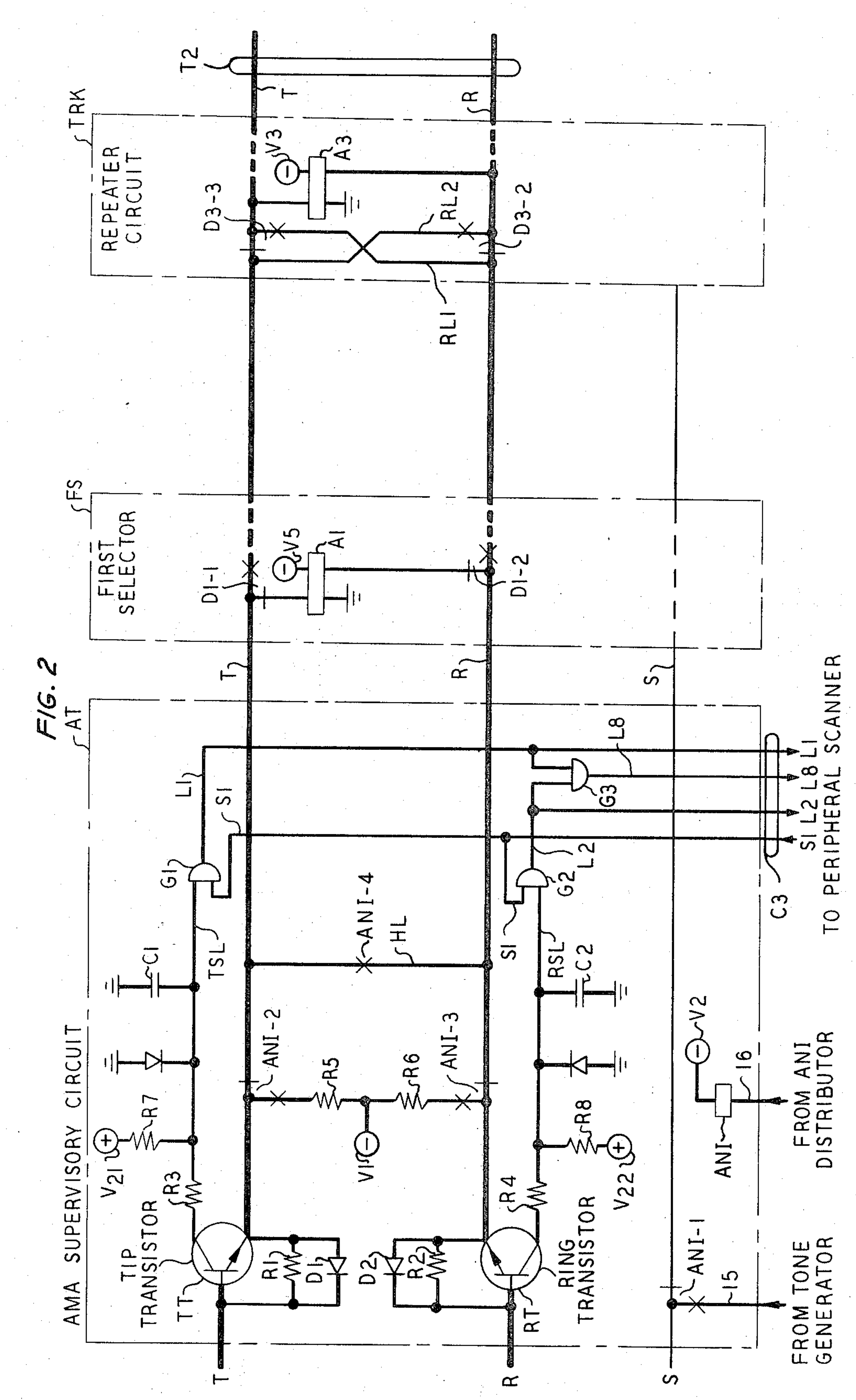
FIG. 2, in accordance with this one illustrative embodiment of my invention, shows in more detail AMA supervisory circuit AT depicted in FIG. 1.

FIG. 2 illustrates the composite elements of AMA supervisory circuit AT illustrated in FIG. 1, and also illustrates certain of the relays and relay contacts in first selector FS and repeater circuit TRK. Each of the elements and leads depicted in FIG. 2 corresponds to its similarly designated counterpart of FIG. 1.

Supervisory circuit AT comprises tip transistor TT and ring transistor RT. Tip transistor TT is adapted to detect current flow in a clockwise direction through a subscriber's loop, and ring transistor RT is adapted to detect current flow in a counterclockwise direction through a subscriber's loop. Each of these transistors is normally in a cutoff state but is saturated when current flows through a subscriber's loop in the direction the transistor is adapted to detect. For example, when current flows in a clockwise direction into the base of tip transistor TT, the transistor goes from a cutoff state (i.e., nonconductive) to a saturated state (i.e., conductive) and current flows from its collector to its emitter. Similarly, when current flows in a counterclockwise direction into the base of ring transistor RT, this transistor saturates. The conductive or nonconductive state of tip transistor TT is respectively represented by a LOW or HIGH signal conveyed over lead TSL to scan gate G1. The conductive or nonconductive state of ring transistor RT is respectively represented by a LOW or HIGH signal conveyed over lead RSL to scan gate G2.

As a call progresses, the conductive or nonconductive states of these transistors, in combination, sequentially define the following information: the off-hook state of the calling station, call destination signals defining the address of a called station (e.g., dial pulses representing dial digits), party identification information, the off-hook state of the called station, and the termination of the call. All the above information is beneficially obtained by interrogating the conductive states of the tip and ring transistors and by processing the obtained information. This interrogation function is performed by peripheral scanner PS which periodically applies a HIGH signal over lead S1 to the inputs of AND gates G1 and G2. As hereinafter described, the output signal from each of these scan gates specifies the conductive state of its associated transistor. Scanner PS conveys these output signals to processor ADP over leads L1 and L2 which are unique to circuit AT. Processor ADP compares these signals with stored information specifying the status of these signals the last time circuit AT was interrogated. If a change in the signals has occurred (e.g., the output of scan gate G2 went from a HIGH state to a LOW state), processor ADP derives call status information, as hereinafter described.

To facilitate an understanding of the operation of this one illustrative embodiment of my invention, I will describe in detail how AMA information is gathered in response to a call instituted by tip-party station TP.

Prior to the institution of this call, subscriber's loop L3 is open. Both the tip transistor TT and ring transistor RT are cut off. Current flows through resistor R7 from positive voltage source V21 and charges capacitor C1. Input lead TSL of AND gate G1 is HIGH due to the voltage on capacitor C1. Similarly, current flows through resistor R8 from positive voltage source V22 connected thereto and charges capacitor C2. Input lead RSL of AND gate G2 is HIGH when capacitor C2 is charged. When peripheral scanner PS periodically applies a HIGH signal over input lead S1 of gates G1 and G2, output leads L1 and L2 go HIGH. Peripheral scanner PS conveys this information to data processor ADP over leads (L1 and L2) in cable C5 unique to circuit AT. Processor ADP, in accordance with its stored program, compares the new information (the two HIGH signals) specifying the nonconductive state of transistors TT and RT with information stored the last time a comparison was effected and specifying the nonconductive state of these transistors at that time. Since no change has occurred in the state of these transistors, processor ADP takes no other action except storing the new information specifying the nonconductive state of these transistors for use in a subsequent comparison.

When tip-party station TP institutes a call by going off-hook, subscriber's loop L3 closes. Line circuit LC1 detects this closure as is well-known in the art, and applies battery to its associated sleeve lead. Line finder LF then hunts to find this sleeve lead, and upon so doing, it connects communication path L5 through to first selector FS. As illustrated in FIG. 2, ground is applied through relay A1 in first selector FS through break-contact D1-1 to the tip lead. Negative battery is applied from source V5 through break-contact D1-2 to the ring lead. Current flows from ground over the tip lead around tip transistor TT via forward biased diode D1. This current continues to flow over the tip lead to tip party station TP and returns over the ring lead to the base of ring transistor RT saturating the transistor. The ring transistor turns on and its collector assumes a negative potential discharging capacitor C2. A LOW signal is applied to the input of gate G2 over lead RSL since capacitor C2 is discharged. Tip transistor TT remains in a cutoff state and lead TSL, as previously described applies a HIGH signal to the input of gate G1. When a HIGH pulse is conveyed over lead S1 from peripheral scanner PS, a HIGH output signal is conveyed over lead L1 from scan gate G1 and a LOW output signal is conveyed over lead L2 from gate G2. The states of these scan gates are conveyed to data processor ADP over cable C5.

Data processor ADP compares the new information (i.e., a HIGH signal associated with gate G1 and a LOW signal associated with gate G2) with the previously stored information specifying a HIGH signal for gate G1 and a HIGH signal for gate G2. After determining that the output state of a gate has changed, processor ADP further consults its stored program and determines that a calling station is now off-hook since the first time the output of gate G2 goes from a HIGH to a LOW state while the output of gate G1 remains HIGH indicates a calling station is off-hook. Processor ADP stores a data word specifying the identity of circuit AT and information indicating that a calling station is off-hook.

In summary, prior to the institution of a call, both scan gates generated HIGH signals when strobed. However, when a calling station went off-hook, the scan gate associated with the ring lead went from a HIGH to a LOW state which was recognized by processor ADP as a service request.

Dial tone is returned to tip-party station TP by first selector FS which impresses a small audio a.c. signal on the tip lead. This signal goes through break-contact ANI-2, diode D1, and is subsequently received by the tip-party station. Diode D2 remains reverse biased during the application of dial tone. This dial tone does not alter the conductive state of either transistor TT or RT because of its small magnitude. In response to the dial tone, the tip party begins dialing. As is known in the art, subscriber's loop L3 opens and closes for each dial pulse. Supervisory circuit AT is adapted to monitor these dial pulses so that data processor ADP can record the identity of the called station. More specifically, for each dial pulse, loop L3 opens, and ring transistor RT goes from a saturated state to a cutoff state; and as previously described, input lead RSL goes from a LOW state to a HIGH state. Peripheral scanner PS periodically applies HIGH signals to gates G1 and G2 at a frequency appreciably greater than the frequency at which dial pulses are received. Data processor ADP, responsive to the information conveyed from peripheral scanner PS concerning circuit AT, counts the number of times that the output of gate G2 associated with the ring transistor goes from a LOW to a HIGH state while the output of gate G1 remains HIGH. This count represents the first digit dialed by the calling party.

First selector FS also detects the dial pulses representing the first digit and steps up the specified number of steps, as is well known in the art. The relay D1 (not shown) operates to cut through the tip, ring, and sleeve leads to repeater circuit TRK by operating relay contacts D1-1 and D1-2. We have assumed that the first digit specified a station in an office accessible by repeater circuit TRK.

It is appropriate to mention at this point that, dependent upon the number of pulses dialed, first selector FS could either cut through the connection to repeater circuit TRK, as described above, or could cut through the connection to a second selector. Supervisory circuit AT is adapted to gather AMA information for interoffice calls through repeater circuit TRK, as well as intraoffice calls directed through subsequent selectors to a connector circuit. This connector circuit would connect the calling station to a called station having an access termination in the depicted office. A connector circuit includes all the leads, contacts, voltage sources, and relays shown in repair circuit TRK. Insofar, as supervisory circuit AT is concerned, the required billing information is identically obtained whether the requested connection is routed through repeater circuit TRK or a connector circuit. A suitable connector circuit is described in regard to FIG. 48 on page 75 of the above-mentioned Miller volume.

Assuming that the first dialed digit specified an interoffice call and the connection was cut through to repeater circuit TRK by the operation of relay contacts D1-1 and D1-2, ground is applied to the tip lead in circuit TRK through relay A3, and negative battery is applied from voltage source V3 to the ring lead. Current continues to flow through subscriber's loop L3 in a counterclockwise direction with a very short interruption as control of the connection transfers from selector FS to circuit TRK. Subsequent scans of gates G1 and G2 and comparisons by processor ADP indicate that the state of the tip and ring transistors have not changed.

Repeater circuit TRK is connected to an incoming selector in a remote step-by-step office via communication path T2. Circuit TRK conveys the remaining dial pulses from the mechanical pulsing dial of station TP to the remote office over path T2. The remote office is responsive to these dial pulses and establishes the specified connection to the called station.

Each of the dial pulses developed by station TP is detected by ring transistor RT in the same manner as previously described in regard to the pulses representing the first dialed digit. To reiterate, ring transistor RT goes from a saturated to a cutoff state each time loop L3 is opened. Peripheral scanner PS conveys the state of this transistor over lead L2 from scan gate G2 to processor ADP which counts the pulses for each dial digit. In this manner processor ADP derives the dial digits specifying the identity of the called station. As hereinafter described, this information is temporarily stored with an indication of supervisory circuit AT for subsequent use if the connection to the called station is completed.

After determining that the last dial digit has been generated by station TP, processor ADP performs a line circuit identification test to identify the line circuit uniquely associated with the calling station. To accomplish this, data processor ADP conveys information to ANI distributor AD identifying supervisory circuit AT. In the manner previously described, ANI distributor AD grounds lead 16 to operate relay ANI. With reference to FIG. 1, relay contacts ANI-1 operate to connect the sleeve lead of circuit AT to tone generator TG which applies a tone to this lead. This tone is conveyed through line finder LF to the sleeve lead associated with line circuiit LC1. Scanner AS stops its scan at input lead 13 when it detects the tone. Since input lead 13 is uniquely associated with line circuit LC1, scanner AS conveys the line equipment number of this line circuit to data processor ADP.

With reference to FIG. 2, the actuation of relay ANI also serves to perform a party identification test to identify whether a tip-party station or a ring-party station has instituted the call. Make-contact ANI-4 operates to close a path between the tip and ring leads. This holds up the connection previously established from first selector FS to the remote office. Relay contacts ANI-2 and ANI-3 also operate to (1) disconnect negative battery V3 in circuit TRK from the subscriber's loop to open the loop, and (2) apply a negative potential from voltage source V1 to the tip and ring leads through resistors R5 and R6, respectively. Since in this illustrative example tip-party station TP is off-hook, current flows from ground through resistor RX in the station over both the tip and ring leads to source V1. This current flow over both the tip and ring leads saturates tip transistor TT as well as ring transistor RT. Leads TSL and RSL both go LOW. Processor ADP stops the sequential scanning of scanner PS and sets the sequencer thereof to a predetermined output lead S1 associated with circuit AT so that a HIGH pulse is conveyed over lead S1 to gates G1 and G2 in circuit AT. Scan gates G1 and G2 both generate LOW output signals. These LOW output signals are combined by AND gate G3 which generates and conveys to processor ADP a LOW output signal over lead L8. A LOW signal over lead L8 indicates a tip-party station has been detected. Processor ADP then signals distributor AD to remove the ground from lead 16 thereby deactivating relay ANI.

If ring-party station RP instead of station TP had been off-hook, current would not flow over either the tip or ring leads from source V1 since coil CR in station RP does not provide a ground path. Thus, both the tip and ring transistors would be cutoff, leads TSL and RSL would be HIGH, and gates G1 and G2 would provide HIGH output signals when strobed over lead S1 under the direct control of processor ADP. Gate G3 would generate a HIGH output signal since both its input leads would be HIGH. This HIGH signal from gate G3 over lead L8 would indicate to processor ADP that a ring-party station was off-hook.

Thus, when a tip-party station is off-hook, current flows through both the tip and ring leads saturating both the tip and ring transistors. Gate G3 generates a LOW signal to indicate this. In contrast, when a ring-party station is off-hook, current does not flow through the subscriber's loop and both the tip and ring transistors remain cutoff. When a HIGH pulse is applied over lead S1 from peripheral scanner PS, gate G3 generates a HIGH signal indicating a ring-party station.

Upon reception of the tip-party indication over cable C5 from peripheral scanner PS, data processor ADP combines the previously obtained line equipment number of line circuit LC1 with the tip-party indication to produce a line equipment number uniquely identifying tip-party station TP. Data processor ADP accesses disc DS using this line equipment number as an address to retrieve, as stored information, the calling number assigned tip-party station TP. Data processor ADP then stores in disc DS in a single entry the calling number, the called number, and the number assigned supervisory circuit AT. Later upon called party's answer, processor ADP, as hereinafter described, stores a second entry specifying the time when answer occurred and the number identifying supervisory circuit AT. A third and final entry is stored at the termination of the call. This entry specifies the time of termination and the number identifying circuit AT. Other data processing apparatus later converts the three entries on disc DS into a single combined entry specifying all required data concerning the call.

The above described party identification test is performed only when a calling station is served by a party line. Processor ADP determines whether a calling line is a party line by evaluating the line equipment number assigned the line circuit associated with the calling line.

Returning now to our illustrative example, when the called station answers, relay D3 (not shown) in repeater trunk TRK is actuated. Relay contacts D3-2 and D3-3 operate to reverse the polarity of the potential applied to the tip and ring lead. Thus, ground is applied to the ring lead via path RL1 and negative potential is applied to the tip lead via path RL2. This reversal of battery causes current flow in subscriber's loop L3 to change from a counterclockwise direction to a clockwise direction. In consequence of this reversal, tip transistor TT goes from a cutoff state to a saturated state and ring transistor RT goes from a saturated state to a cutoff state. Lead TSL of gate G1 goes LOW and lead RSL of gate G2 goes HIGH. When gates G1 and G2 are strobed by a HIGH pulse over lead S1, output lead L1 goes LOW and output lead L2 goes HIGH. Peripheral scanner conveys these output signals to data processor ADP. Processor ADP determines that the called party has answered since the tip transistor is now in a conductive state and the ring transistor is in a nonconductive state. This combination exists only after the called station has gone off-hook. Processor ADP first stores in memory the new output states of gates G1 and G2 and then stores a second entry in disc DS which specifies the identity of circuit AT and the same at which answer was detected.

While the parties continue their conversation, tip transistor TT remains in a conductive state and ring transistor RT remains in a nonconductive state. However, when the called station goes on-hook, the connection first releases in the remote office and then results in the breakdown of the connection in the depicted office. In consequence of this breakdown, battery is disconnected from the tip and ring leads connected to subscriber's loop L3. Since no current flows through the loop, both the tip transistor and ring transistor go into a cutoff state. Leads TSL and RSL go HIGH and gates G1 and G2 generate HIGH output signals when strobed by peripheral scanner PS. Data processor ADP determines from the specified nonconductive states of both the tip and ring transistors and the prior stored states of these transistors (i.e., tip transistor-conductive; ring transistor-nonconductive) that the call has ended. Processor ADP then stores a third and final entry on disc DS specifying the identity of circuit AT and the time at which the release of the established connection was detected.

Auxiliary computing apparatus at a latter time retrieves the information stored on disc DS and collates the three entries made, in regard to the previously discussed example, into a single entry which specifies all required billing information concerning the call.

In summary, processor ADP is sequentially informed of the present conductive or nonconductive state of tip transistor TT and ring transistor RT, and compares these present states with the priorly stored states of these transistors to derive the present status of a call. These transistors are also beneficially utilized to perform a party identification test to determine whether a tip-party station or a ring-party station is instituting a call.

What is claimed is:

1. In a telephone system having first and second stations connected to a two-wire transmission path, which stations when enabled connect together the two wires of said path to form a signaling loop, only said first station when enabled applying a potential thereat to one of said wires and said system further having a current source in said loop for causing current to flow in one direction through said loop when either of said first or second stations is enabled and said stations generating call destination signals by disconnecting and reconnecting said two wires;

a supervisory circuit for detecting call destination signals, and for indicating which of said stations is enabled, which comprises:

first means connected in one of said wires between said current source and said stations for detecting current flow through said loop in one direction;

second means connected in the other of said wires between said current source and said stations for detecting current flow through said loop in the opposite direction;

logic means responsive to said first and second detecting means for indicating a said call destination signal when neither said first and second detecting means detects current flow;

means for disconnecting said current source from said loop and for applying another potential to both said wires, and said logic means being further responsive to said first and second detecting means during application of said other potential, for indicating said first station if both said detecting means detect current flow and for indicating said second station if neither of said detecting means detects current flow.

2. The supervisory circuit according to claim 1 wherein said first detecting means comprises semiconductor means adapted to detect current flow in said one wire in said one direction, said second detecting means comprises semiconductor means adapted to detect current flow in said other wire in said opposite direction, and said logic means comprises gating means responsive to both said semiconductor means.

3. In a telephone system wherein a calling station is identified as active by current flow in one direction through a signaling loop comprising two transmission conductors which are connected together at said calling station while said calling station remains active and wherein a called station is identified as active by current flow in the opposite direction through said signaling loop, a supervisory circuit for connection in said loop comprising first sensing means connected in one of said conductors for detecting current flow through said loop only in said one direction, second sensing means connected in the other of said conductors for detecting current flow through said loop only in said opposite direction, and logic means responsive to said first and second sensing means in combination for indicating 1. an active calling station when only said first sensing means detects current flow,
2. a call destination signal when neither said first and second sensing means detects current flow, and
3. an active called station when only said second sensing means detects current flow.

4. In a telephone system according to claim 3, said first sensing means comprising a first transistor adapted to saturate when current flows in said one direction through said one conductor, said second sensing means comprising a second transistor adapted to saturate when current flows in said opposite direction through said other conductor, and said logic means comprising a first scan gate for providing a first signal specifying the saturated or nonsaturated state of said first transistor, and a second scan gate for providing a second signal specifying the saturated or nonsaturated state of said second transistor.

5. In a telephone system according to claim 3 having first and second stations both connected to said loop, only said first station when active applying a potential thereat to one of said conductors, said supervisory circuit further comprising test means for opening said signaling loop and for applying another potential to both said conductors, and wherein said first sensing means is connected in said one conductor between said test means and said first and second stations, and said second sensing means is connected in said other conductor between said test means and said first and second stations, and wherein said logic means further comprises means for indicating that said first station is active when both said first and second sensing means detect current flow and for indicating that said second station is active when neither of said first and second sensing means detects current flow.

6. In a telephone system according to claim 5 having a current source connected in said signaling loop, said test means comprising switch means for opening said loop by disconnecting said current source from said loop and for connecting a source of said other potential to both said conductors.

7. In a step-by-step telephone switching system having first and second stations connected to a two-wire transmission path, which stations when enabled connect together the two wires of said path to form a signaling loop, only said first station when enabled applying a potential thereat to one of said wires, said system further having a current source connected in said loop for causing current to flow in one direction through said loop when either of said first or second stations is enabled and current reversing means for causing current to flow in the opposite direction through said loop when a called station is enabled, a supervisory circuit for connection between a line finder and a first selector, which comprises first sensing means for connection to one of said wires between said current source and said first and second stations for detecting current flow through said loop in said one direction, second sensing means for connection to the other of said wires between said current source and said first and second stations for detecting current flow through said loop in said opposite direction, actuatable means for disconnecting said current source from said loop to open said loop and for applying another potential to both said wires, means responsive to said first and second sensing means in combination for indicating 1. an active calling station when only said first sensing means detects current flow,
2. a dial pulse when neither said first and second sensing means detects current flow,
3. that said first station is active when said actuatable means is actuated and both said sensing means detect current flow or that said second station is active when said actuatable means is actuated and neither of said sensing means detects current flow, and
4. an active called station when only said second sensing means detects current flow.

8. In a step-by-step system having a line finder and a first selector connectible to said line finder over a tip lead, a ring lead and a sleeve lead, a detection circuit for insertion between said line finder and said first selector comprising a tip transistor having a base terminal connectible to said tip lead for detecting current flow over said tip lead, a ring transistor having a base terminal connectible to said ring lead for detecting current flow over said ring lead, said tip and ring transistors for detecting current flow in opposite directions through a signaling loop including said tip and ring leads, and gating means responsive to said transistors for sequentially conveying call signaling and charging information concerning a call directed over said tip and ring leads.

9. In a step-by-step switching system, a supervisory circuit for insertion in the tip and ring leads between a line finder and a first selector as a source of call data signals, which comprises, a tip transistor having a base terminal connectible to said tip lead, an emitter terminal, and a collector terminal, said tip transistor adapted to saturate only when current flows into said base terminal of said tip transistor, a first diode adapted to conduct current around said tip transistor from said emitter terminal of said tip transistor to said base terminal of said tip transistor, a first capacitor connected to said collector terminal of said tip transistor adapted to discharge only when said tip transistor is saturated, a first scan gate responsive to said first capacitor for providing a signal specifying the saturated or nonsaturated state of said tip transistor, a ring transistor having a base terminal connectible to said ring lead, an emitter terminal, and a collector terminal, said ring transistor adapted to saturate only when current flows into said base terminal of said ring transistor, a second diode adapted to conduct current around said ring transistor from said emitter terminal of said ring transistor to said base terminal of said ring transistor, a second capacitor connected to said collector terminal of said ring transistor adapted to discharge only when said ring transistor is saturated, and a second scan gate responsive to said second capacitor for providing a signal specifying the saturated or nonsaturated state of said ring transistor.

10. In a telephone switching system, a supervisory circuit comprising, a first transistor having a base terminal connectible to one wire of a subscriber's loop for detecting the presence of current flow over said one wire, a first capacitor responsive to said first transistor for discharging only when said first transistor detects current flow over said one wire, a first actuatable scan gate responsive to said first capacitor for providing a LOW output signal if said first capacitor is discharged, a second transistor having a base terminal connectible to the other wire of said subscriber's loop for detecting the presence of current flow over said other wire, a second capacitor responsive to said second transistor for discharging when said second transistor detects current flow over said other wire, a second actuatable scan gate responsive to said second capacitor for providing a LOW output signal if said second capacitor is discharged, and a lead connected to said first and second scan gates for concurrently actuating said gates responsive to application of a scan enable signal to said lead.

* * * * *